United States Patent [19]

Vacanti

[11] Patent Number: 5,080,396
[45] Date of Patent: Jan. 14, 1992

[54] CLIP DEVICE FOR SEAT BELTS
[76] Inventor: Sam D. Vacanti, Rte. 1, Box 1562, Delevan, N.Y. 14042
[21] Appl. No.: 628,522
[22] Filed: Dec. 17, 1990
[51] Int. Cl.⁵ .............................................. B60R 22/00
[52] U.S. Cl. ..................................... 280/808; 297/482
[58] Field of Search ................ 280/808, 801; 297/483, 297/482

[56] References Cited
U.S. PATENT DOCUMENTS

| | | | |
|---|---|---|---|
| 4,648,625 | 3/1987 | Lynch | 280/808 |
| 4,832,367 | 5/1989 | Lisenby | 280/808 |
| 4,840,404 | 6/1989 | Falterman | 280/808 |
| 4,893,835 | 1/1990 | Linden | 280/808 |
| 4,946,198 | 8/1990 | Pittore et al. | 280/808 |

Primary Examiner—Kenneth R. Rice
Assistant Examiner—Paul Dickson
Attorney, Agent, or Firm—Henderson & Sturm

[57] ABSTRACT

A clip device (10) for varying the relative position between the shoulder (101) and lap (102) seat belt straps in a dual seat belt arrangement (100). The clip device (10) comprises an upper (11) and lower (12) clip units operatively connected to one another by a resilient adjustable length intermediate tether member (21).

3 Claims, 1 Drawing Sheet

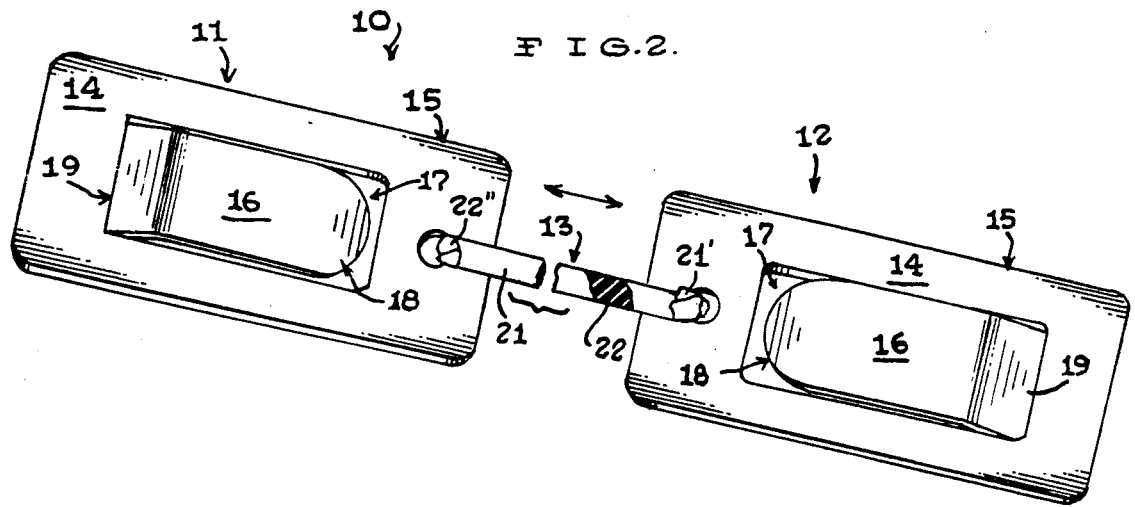
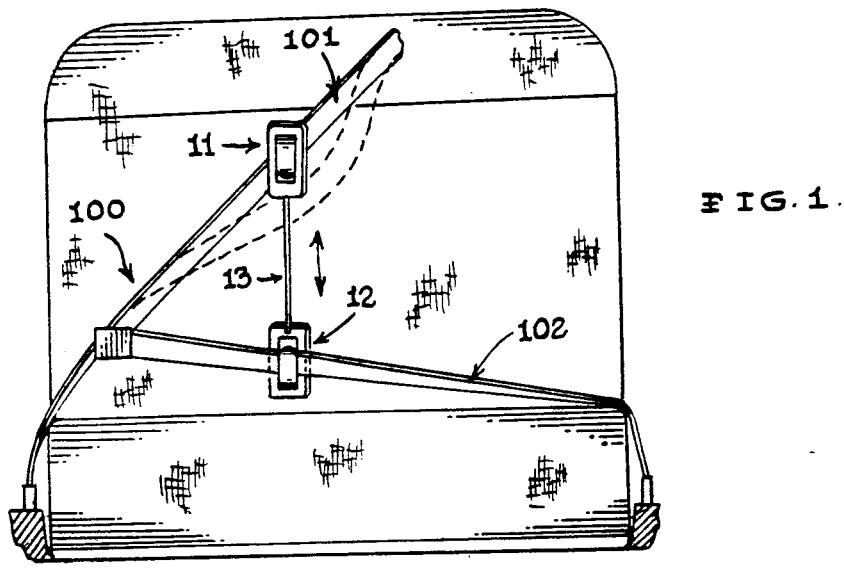
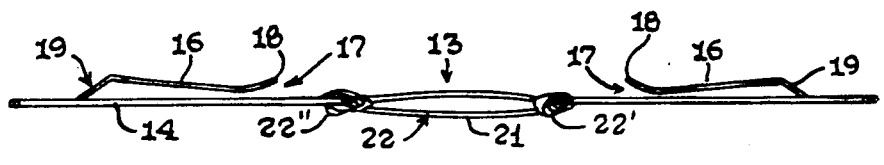

CLIP DEVICE FOR SEAT BELTS

TECHNICAL FIELD

The present invention relates to the field of seat belt arrangements, and in particular to a device for modifying the relative positions between a lap seat belt and a shoulder seat belt.

BACKGROUND ART

As can be seen by reference to the following U.S. Pat. Nos. 4,648,625; 4,832,367; 4,840,404; and 4,893,835; the prior art is replete with myriad and diverse seat belt arrangements including at least one arrangement for relieving the tension of a single seat belt.

While all of the aforementioned prior art constructions are more than adequate for the basic purpose and function for which they are designed, these patented arrangements are uniformly deficient with regard to the problem that many individuals encounter by virtue of the across the chest disposition of most shoulder seat belts, as well as in some instances, the restrictive engagement of a lap seat belt with the user's lower torso.

While at least one of the above cited patents addresses the problem with the shoulder seat belt, no adequate solution was developed for the lap seat belt, no less the situation wherein both a lap and a shoulder seat belt are used in combination with one another.

As a consequence of the foregoing situation, there has existed a longstanding need particularly among those car owners whose cars employ a combination lap and shoulder seat belt arrangement for a new device that will relieve the pressure and adjust the relative placement of both the lap and the shoulder seat belt straps. The provision of such a construction is a stated objective of the present invention.

DISCLOSURE OF THE INVENTION

Briefly stated, the clip device that forms the basis of the present invention comprises in general an upper clip unit, a lower clip unit, and an intermediate tether unit which operatively connects the upper and the lower clip units together.

Furthermore, both the upper and the lower clip units are mirror images of one another. In the preferred embodiment of the invention, each of the clip units is formed integrally from a single sheet of material.

As will be explained in greater detail further on in the specification, the upper clip unit has a downwardly facing opening dimensioned to fit over the top and receive at least a portion of the shoulder seat belt strap. The lower clip unit has an upwardly facing opening dimensioned to fit over the bottom and receive at least a portion of the lap seat belt strap.

In addition, the intermediate tether unit which connects the upper clip unit to the lower clip unit is designed to be both flexible and adjustable. The spacing between the upper and the lower clip unit may be varied without interfering with the intended mode of operation of the lap and shoulder seat belt straps in the event of a collision.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the clip device installed on a conventional lap and shoulder seat belt configuration;

FIG. 2 is an isolated perspective view of the clip device; and

FIG. 3 is a side plan view of the clip device.

BEST MODE FOR CARRYING OUT THE INVENTION

As can be seen by reference to the drawings, and in particular to FIG. 1, the clip device that forms the basis of the present invention is designated generally by the reference numeral (10). The device (10) is specifically designed to be employed with a dual seat belt arrangement (100) which includes a lap seat belt strap (101) and a shoulder seat belt strap (102).

The device (10) comprises in general an upper clip unit (11), a lower clip unit (12), and an intermediate tether unit (13). Tether unit (13) connects the upper clip unit (11) to the lower clip unit (12). These units will now be described in seriatim fashion.

As can best be seen by reference to FIGS. 2 and 3, the upper (11) and lower (12) clip units are mirror images of one another. In addition, each of the clip units (11, 12) comprises a one-piece clip member (14) fabricated from a single sheet of material (15) such as metal or plastic. The central portion of the clip member (14) has been partially severed in a U-shaped configuration. The partially severed portion forms a clip tongue element (16) defining a clip opening (17).

As can best be seen by reference to FIGS. 2 and 3, the free end (18) of the tongue element (16) is bent upwardly to facilitate the insertion of at least a portion of one of the seat belt straps (101, 102). The captive end (19) of the tongue element (16) forms a resilient hinge which will maintain the intermediate portion of the tongue element (16) generally parallel to, but spaced from the remainder of the clip member (14) in a well-recognized fashion.

Turning now to FIG. 2, it can be seen that each of the clip members (14) has an aperture (20) disposed proximate the face end (18) of the tongue element (16), and whose purpose and function will be described presently.

As shown in FIGS. 2 and 3, the intermediate tether unit (13) in the preferred embodiment of the invention comprises an adjustable length resilient tether member (21) which is operatively connected on its opposite ends to the upper (11) and lower (12) clip units via the apertures (20) in the respective clip members (14).

As can also be seen by reference to FIGS. 2 and 3, the resilient tether member (21) in the preferred embodiment comprises a closed loop rubber band element (22). The first looped end (22') is passed through one of the apertures (20) and the second looped end (22") is passed through the first looped end (22'). The second looped end (22") is passed through the other aperture. The captive clip member is passed through the second looped end (22") to complete the operative engagement between the tether member (24) and the upper (11) and lower (12) clip units in a well recognized fashion.

In this particular version of the clip device (10) the adjustable nature of the tether member (21) is accomplished by twisting the rubber band element (22) to shorten the effective length of the tether member.

While a rubber band element (22) has been described as the preferred embodiment of the adjustable resilient tether member (21), it is to be understood that the intermediate tether unit (13) of this invention may comprise any adjustable length generally resilient tether member (21) in keeping with the teachings of this invention.

Turning now to FIG. 1, it can be seen that the upper clip unit (11) is dimensioned and designed to releasably engage at least a portion of the upper surface of the shoulder seat belt strap (101) of a conventional dual belt seat belt arrangement (100). The lower clip unit (12) is dimensioned and designed to releasably engage at least a portion of the lower surface of the lap seat belt strap (102) to resiliently vary the relative spacing between the shoulder (101) and lap (102) seat belt straps in a well recognized fashion.

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim:

1. A clip device for a dual belt seat belt arrangement including a shoulder seat belt strap and a lap seat belt strap wherein the clip device comprises:
   an upper clip unit having a resilient tongue element adapted to releasably engage at least a portion of the shoulder seat belt strap;
   a lower clip unit having a resilient tongue element adapted to releasably engage at least a portion of the lap seat belt strap; and
   an intermediate tether unit for operatively connecting the upper clip unit to the lower clip unit for varying the relative positioning between the said shoulder and lap seat belt strap; wherein, said intermediate tether unit comprises a closed loop rubber band element which is captively engaged on each end with said upper and lower clip units.

2. The clip device as in claim 1 wherein each of said clip units comprise:
   a one-piece clip member fabricated from a single sheet of material.

3. The clip device as in claim 2 wherein the central portion of the clip member forms a clip tongue element which defines a clip opening.

* * * * *